May 24, 1966  A. R. GETZIN ETAL  3,252,691
GAS CLEANING APPARATUS
Filed March 30, 1962
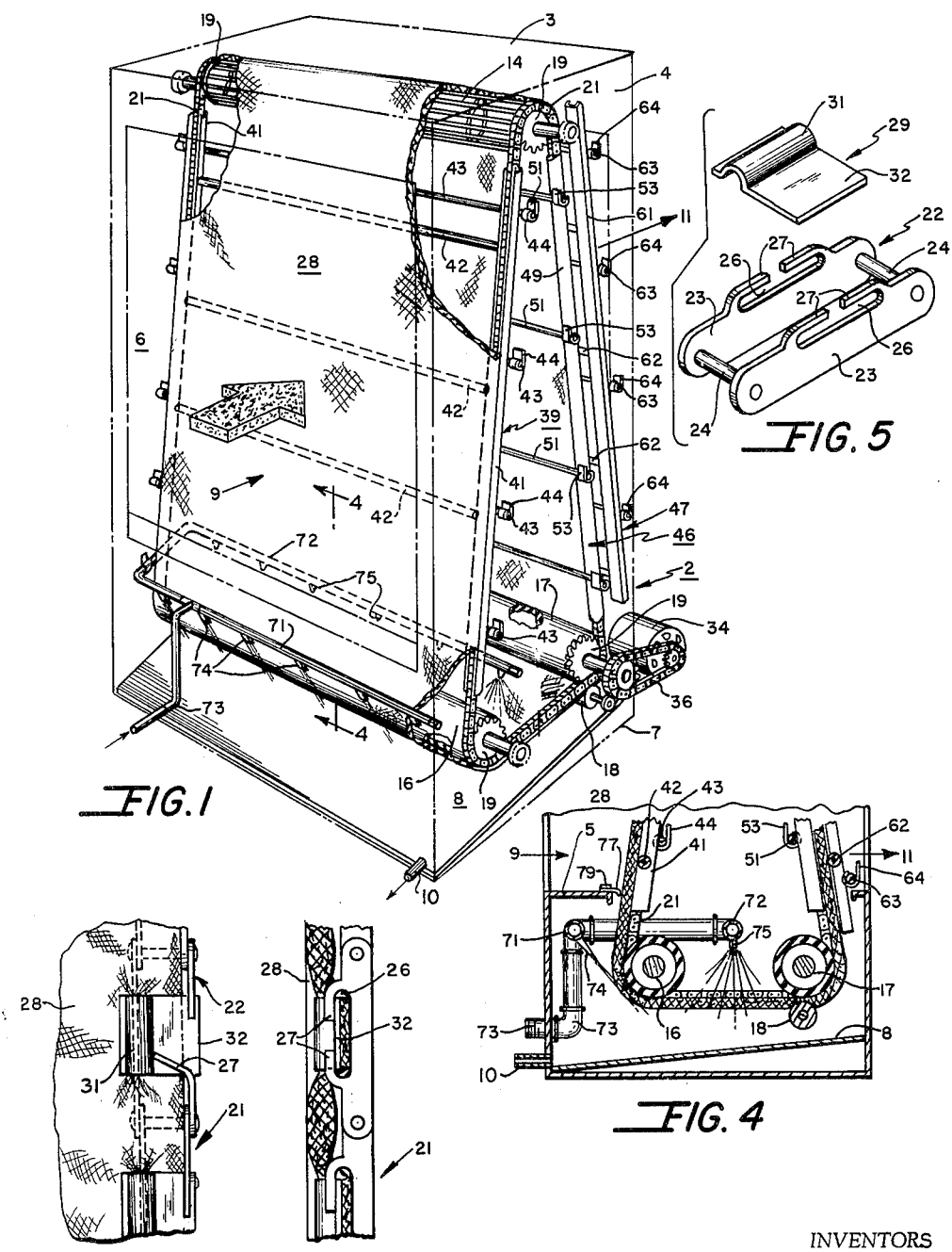
INVENTORS
ERVIN A. McCLAIN
ALLAN R. GETZIN
BY
Ralph B. Brick
ATTORNEY

3,252,691
GAS CLEANING APPARATUS

Allan R. Getzin, Jeffersontown, and Ervin A. McClain, Louisville, Ky., assignors to American Air Filter Company, Inc., Louisville, Ky., a corporation of Delaware
Filed Mar. 30, 1962, Ser. No. 183,815
4 Claims. (Cl. 261—80)

The present invention relates to gas cleaning apparatus and more particularly to improved gas cleaning apparatus of the type having movable filter medium in the form of an endless belt.

In accordance with the present invention, an improved, efficiently operated structure is provided for conveying a porous filter medium belt disposed in endless fashion through a gas stream to be treated, the filter medium belt being fastened to conveyor mechanism in a novel manner to avoid past problems of medium gathering. In addition, the present invention provides a novel manner of cleaning the filter medium belt outside the gas stream to be treated, a maximum of contaminant particles being removed from the medium in a simple and straightforward manner. Further, the present invention provides a novel support arrangement for the filter medium as it is passed through the gas stream to be treated, the support arrangement being adapted for ready installation and removal and for ready shipping and repairs.

Various other features of the present invention will become obvious to one skilled in the art upon reading the disclosure set forth herein.

More particularly, the present invention provides a gas cleaning apparatus comprising: a housing having an upstream gas inlet and a downstream gas outlet to define a path for a gas stream to be treated; a pair of spaced support roller means rotatably positioned in the housing on opposite sides of the gas stream to be treated; a porous filter medium belt disposed in endless fashion about the spaced support roller means; means to drive the filter medium belt whereby the belt is passed through the gas stream to be treated; and, means to direct a fluid cleaning stream against the belt outside the gas stream to be treated, such means including a nozzle member arranged to direct the fluid cleaning stream in a flat sheet tangential to the outer face of the belt in the area where the belt engages the support roller means where the pores of the belt are in open position. In addition, the present invention provides unitary support cradle means including hanger means to removably suspend such cradle means to the side walls of the housing in proper position to support the belt. Further, the present invention provides novel slotted link chain members in which the side edges of the filter medium belt are inserted and hold-down clip members cooperating with the slotted link chain members and the side edges of the belt to retain such side edges in place.

It is to be understood that various changes can be made by one skilled in the art in the arrangement, form and construction of the apparatus disclosed herein without departing from the scope or spirit of the present invention.

Referring to the drawing which discloses one advantageous embodiment of the present invention:

FIGURE 1 is a perspective, partially broken-away view of the novel apparatus of the present invention;

FIGURE 2 is an enlarged, front view of a portion of the filter medium belt of FIGURE 1 disclosing features of the slotted link conveyor chain;

FIGURE 3 is a side view of the structure of FIGURE 2;

FIGURE 4 is a cross-sectional side view of a portion of the structure of FIGURE 1 viewed in the direction of line 4—4 of FIGURE 1; and FIGURE 5 is an enlarged, exploded, perspective view of a slotted link and hold-down clip assembly.

As can be seen in FIGURE 1 of the drawing, vertical housing 2 is disclosed as including roof 3, side walls 4 and 6, bottom wall 7 and inclined bottom drain panel 8 above bottom wall 7. Housing 2 is provided with upstream gas inlet 9 and downstream gas outlet 11, bottom drain panel 8 being arranged to slope downwardly toward gas inlet 9 into a suitable drain outlet 10.

Rotatably mounted in suitable bearing block structure (not shown) in side walls 4 and 6 so as to be in vertically spaced relationship in the upper and lower portions of housing 2 are upper support roller 14 and lower horizontally spaced, upstream and downstream support rollers 16 and 17, respectively. Advantageously, lower support rollers 16 and 17 can be formed from hollow steel cylinders and upper support roller 14 can be formed from a wire frame cylinder to reduce weight in assembly and shipment.

Extending parallel to and adjacent downstream lower support roller 17 in close relationship therewith is squeeze roller 18. Roller 18, like rollers 14, 16 and 17, also is rotatably mounted between side walls 4 and 6 of housing 2 in suitable bearing block structure (not shown). Advantageously, roller 18 can be made from any one of a number of suitable hard rubber composition materials.

Mounted at opposite ends of each of support rollers 14, 16 and 17 are sprocket members 19, these sprocket members serving to engage with a pair of spaced endless slotted link chain members 21 mounted thereon. As can be seen in FIGURES 2, 3 and 5 of the drawing, links 22 of chain members 21 are composed of identical spaced inside and outside side wall members 23 which are held together at their extremities by transverse pins 24, the outside side wall members 23 being those positioned closest to side walls 4 and 6 respectively of housing 2. Each sidewall member 23 is provided with a longitudinally extending slot 26, one side of such slot being defined by a pair of pliable wing members 27. Slots 26 of the outside side wall members 23 of links 22 serve to receive a portion of hold-down clip members, as described hereinafter to fasten the longitudinal side edges of filter medium belt 28 which is disposed in endless fashion about support rollers 14, 16 and 17, the belt 28 being so arranged that the edges thereof extend over the wing members 27 of inside side wall members 23. It is to be noted that filter medium belt 28 is arranged to pass between lower downstream support roller 17 and squeeze roller 18 to be compressed therebetween. Belt 28 can be made from any one of a number of suitable strips of filter medium material and, advantageously, can be made from a strip of compressible-expansible elastic foam polyurethane material similar to that described in assignee's application Serial No. 58,929, filed on September 28, 1960, now U.S. Patent No. 3,127,256 in the name of Robert J. Boylan. As in the aforenoted application, once the strip of filter medium material has been mounted around support rollers 14, 16 and 17, the opposite ends can be fastened together to form an endless belt. It is to be understood that various fastening arrangement for the opposite ends of the belt can be used and, advantageously, a fastening arrangement like that disclosed in the aforementioned application can be employed, such fastening arrangement including facing tape members in the form of interlockable pile threads.

Once the longitudinal side edges of belt 28 have been fastened by hold down clips 29, movement of chain members 21 causes belt 28 to be moved along therewith. As can be seen in FIGURE 5, each clip member 29 inculdes a recessed portion 31 and a tongue portion 32 extending therefrom. With the filter medium edges properly extending in overlapping fashion over wing members 27 of inside side wall members 23, in order to hold the filter medium edges in position, it is only necessary that the recessed portion 31 of each clip 29 be arranged to extend in overlapping fashion over the medium and the edge of inside side wall member 23 of a link so that the opposed tongue portion 32 engages in slot 26 of the opposite or outside side wall member 23 of the link (FIGURES 2 and 3). To secure the clip, a wing 27 of the outside side wall members 23 can be bent inwardly to extend over tongue portion 32, abutting against the recessed portion 31.

In order to drive endless chain members 21 and the belt 28 extending therebetween and attached thereto, a suitable drive motor 34 is provided, motor 34 being connected to downstream support roller 17 by chain and sprocket drive 36. It is to be understood that the present invention is not to be considered as limited to the specific drive arrangement disclosed and, if desired, the drive can be accomplished through either one of the other two rollers 14, 16.

To further support filter medium belt 28 in the gas stream to be treated, a readily installable unitary support cradle 39 is provided to be positioned immediately behind the upstream flight of belt 28. Support cradle 39 is comprised of a pair of spaced longitudinally extending U-shaped channel support members 41, which serve to receive and guide the upstream flights of endless chain members 21, thus avoiding any necking of filter medium belt 28 attached to the chain members as the belt travels through the gas stream to be treated. Rotatably mounted to and extending between channel support members 41 are spaced idle rollers 42 which serve to back up and support filter medium belt 28 as it passes thereover. To hold cradle 39 in a preselected position in housing 2, a set of spaced suspension bars 43 extend transverse to and are fixed to channel support members 41. Bars 43 are sized in length so that the free ends thereof can removably nest in stirrups 44 mounted to side walls 4 and 6 of housing 2. It is to be noted that not only do bars 43 serve as a ready means for suspension of support cradle 39 in housing 2, but, in addition, they add further stability to the cradle.

On the downstream side of filter medium belt 28, a support cradle structure slightly different from support cradle assembly 29 aforedescribed is provided. The downstream flight cradle arrangement, in effect, includes two unitary cradles 46 and 47. Cradle 46 is comprised of a pair of spaced longitudinally extending U-shaped channel support members 49 which have fixed thereto a set of spaced transverse suspension bars 51. Like suspension bars 43, bars 51 are sized in length so that the free ends thereof can removably engage in stirrups 53 also mounted to side walls 4 and 6 of housing 2. Cradle 46 is positioned in such a manner that it faces the upstream face of downstream flight of belt 28, receiving and guiding the downstream flights of endless chain members 21 in a manner similar to the manner in which the upstream flights are received and guided. Cradle 47, on the other hand, is positioned to face the downstream face of the downstream flight of belt 28. Cradle 47 includes two longitudinally extending channel support members 61 which serve to support spaced, transversely extending idle rollers 62 therein in a manner similar to the manner in which idle rollers 42 of cradle 39 are supported. Suitably spaced transverse suspension bars 63 are mounted to channel members 61, the bars being so sized that the free ends engage in stirrups 64 also mounted to side walls 4 and 6 of housing 2.

In order to clean filter medium belt 28 of contaminant particles which collect thereon, a washer arrangement is provided to direct fluid cleaning streams against the belt outside the treated gas stream. This washer arrangement includes a pair of spaced parallel header pipes 71 and 72 (FIGURE 4) connected by inlet conduit 73 to a suitable supply (not shown) of cleaning fluid such as water. Pipe 71 is provided with a plurality of spaced, flat lipped nozzles 74 (FIGURE 4) arranged to direct flat sheets tangentially to the outer face of the belt in that area where the belt engages support roller 16. It is to be noted that at this area of the belt, the pores of the outer face of the belt are maintained in a stretched open position so that a thorough cleaning action is provided.

Pipe 72, which is parallel to pipe 71, is provided with a plurality of spaced cone-shaped nozzles 75 (FIGURE 4) arranged to direct cones of cleaning fluid against the inner face of belt 28 intermediate the upstream and downstream flights. It is to be noted that as the cleaning fluid drains from belt 28 it falls onto inclined drain panel 8 to flow by gravity to drain outlet 10.

It has been found desirable to provide gas seals along the upstream face of the upstream flight of belt 28. In this connection, attention is directed again to FIGURE 4 of the drawing wherein there is disclosed a seal 77 fastened to ledge 5 of housing 2 by means of a transversely extending seal bar 79. It is to be understood that, in a similar manner, suitable longitudinally extending seal members are provided along the side edges and at the top portion of belt 28, thus insuring that a dirty gas stream to be treated does not bypass the belt. In like fashion and if desired, suitable seal members can be provided at the downstream flight of the belt.

In a typical operation of the disclosed apparatus, filter medium belt 28 is rotated during gas cleaning operations through drive motor 34 and endless chain conveyor arrangement 21 to advance in a preselected timed cycle, a washing liquid being delivered through pipes 71 and 72 and the nozzles attached thereto to wash the belt clean of any contaminant particles collected thereon, as the belt is advanced.

The invention claimed is:
1. A gas cleaning apparatus comprising:
   (a) a housing having an upstream gas inlet and a downstream gas outlet spaced therefrom to define a path for a gas stream to be treated;
   (b) a pair of spaced support roller means positioned in said housing so that one roller means of said pair is on one side of said gas stream to be treated and the other roller means is on the opposite side of a gas stream to be treated;
   (c) a porous filter medium belt disposed in endless fashion about said spaced support roller means;
   (d) means to drive said filter medium belt whereby said belt is passed through a gas stream to be treated; and
   (e) means to direct a fluid cleaning stream against said belt outside a gas stream to be treated;
   (f) said means to direct a fluid cleaning stream including a nozzle having means to direct flat sheets and having its longitudinal axis extending normal to a radial plane of said support roller means extending through the mid-portion of that area of said belt which engages against said support roller means to direct said fluid cleaning stream in flat sheets tangential to the outer face of said belt in said area where said belt engages said support roller means and the pores of said belt are spread open.

2. A gas cleaning apparatus comprising:
   (a) a vertically disposed housing having an upstream gas inlet and a downstream gas outlet spaced therefrom to define a path for a gas stream to be treated;
   (b) a pair of spaced upper and lower support roller means positioned in said housing so that one roller means of said pair is on one side of said gas stream to be treated and the other roller means is on the opposite side of a gas stream to be treated;
   (c) said spaced support roller means including a single upper roller and a pair of horizontally spaced upstream and downstream lower rollers;
   (d) a squeeze roller positioned in spaced relationship to and cooperating with said downstream lower support roller;
   (e) sprocket members mounted at opposite ends of each of said support rollers;

(f) a pair of spaced endless slotted link chain members mounted on said sprocket members of said support rollers;

(g) a porous compressible-expansible filter medium belt disposed in endless fashion about said spaced upper and lower support rollers to pass between the space between said downstream support roller and said cooperating squeeze roller with the side edges thereof overlapping said slotted links of said endless chain members;

(h) hold down clip means cooperating with said slotted links to retain the edges of said filter medium belt in engaged position;

(i) a unitary support cradle having hanger means removably suspended within and from the side walls of said housing in a downstream plane adjacent to and parallel the plane determining the upstream flight of said endless filter medium belt to support the upstream flight of said endless filter medium belt;

(j) said support cradle including a pair of spaced U-shaped support members longitudinally extending adjacent and parallel the upstream flights of said spaced endless slotted link chains to receive and guide said upstream flights of said chains;

(k) said U-shaped support members having a plurality of spaced, horizontally extending idle rollers mounted therebetween;

(l) means to direct a fluid cleaning stream against said filter medium belt outside a gas stream to be treated;

(m) said means to direct a fluid cleaning stream including a first nozzle having means to direct a flat sheet and having its longitudinal axis extending normal to a radial plane of said upstream lower support roller which plane extends through the mid-portion of that area of said belt where said belt engages the upstream lower support roller to direct a fluid cleaning stream in a flat sheet tangential to the outer face of said belt in that area where said belt engages the upstream lower support roller and means including a second nozzle to direct a fluid cleaning stream in a cone spray against the inner face of said belt in that area between said spaced lower upstream and lower downstream support rollers; and, (n) means to drive said endless slotted link chain members whereby said filter medium belt attached thereto is passed through the gas stream to be treated.

3. A gas cleaning apparatus comprising:
(a) a housing having an upstream gas inlet and a downstream gas outlet spaced therefrom to define a path for a gas stream to be treated;
(b) a pair of spaced support roller means rotatably positioned in said housing so that one roller means of said pair is on one side of said gas stream to be treated and the other roller means is on the opposite side of a gas stream to be treated;
(c) a porous, filter medium belt disposed in endless fashion about said support roller means;
(d) an integral unitary support cradle including a pair of spaced longitudinally extending support members with spaced idle rollers mounted transversely therebetween;
(e) said unitary support cradle including a set of spaced suspension bars fastened to and extending transversely of said support members; spaced U-shaped support stirrups mounted to said housing to receive the ends of said suspension bars at a position whereby said cradle can be removably suspended within and from the side walls of said housing in a downstream plane adjacent to and parallel the plane determining the upstream flight of said endless filter medium belt to support the upstream flight of said endless filter medium belt; and (f) means to drive said filter medium belt whereby said belt is passed through a gas stream to be treated.

4. A gas cleaning apparatus comprising:
(a) a housing having an upstream gas inlet and a downstream gas outlet spaced therefrom to define a path for a gas stream to be treated;
(b) a pair of spaced support roller means rotatably positioned in said housing so that one roller means of said pair is on one side of a gas stream to be treated and the other roller means is on the opposite side of the gas stream to be treated;
(c) sprocket members mounted at opposite ends of each of said support roller means;
(d) a pair of spaced endless slotted link chain members mounted on said sprocket members, the links of said endless chain members including opposed spaced slotted inside and outside side wall members with at least said outside side wall member of each link having a slot defining side in the form of opposed pliable wing member means;
(e) a porous compressible-expansible filter medium belt disposed in endless fashion about said support roller means with the side edges thereof overlapping said slotted links of said endless chain members;
(f) hold down clip means cooperating with said slotted links to retain the edges of said filter medium in engaged position, said hold down clip means each including a recessed portion and an opposed tongue portion, the recessed portion of said clip means extending in overlapping position over the medium and edge of said inside side wall member of a link with the opposed tongue portion of the clip means extending into the slot of said outside side wall member having said pliable wing member means;
(g) said pliable wing member means extending inwardly at an acute angle toward the recessed portion to maintain the clip in hold down position, and
(h) means to drive said endless slotted-link chain members whereby said filter medium belt attached thereto is passed through the gas stream to be treated.

References Cited by the Examiner
UNITED STATES PATENTS

| | | | |
|---|---|---|---|
| 1,222,751 | 4/1917 | Frohrieb | 55—290 |
| 1,793,246 | 2/1931 | Philips. | |
| 1,797,248 | 3/1931 | Szegvari et al. | 55—354 X |
| 1,862,839 | 6/1932 | Brelsford et al. | 55—290 |
| 2,076,305 | 4/1937 | Strindberg | 55—290 |
| 2,232,561 | 2/1941 | Richards | 261—80 X |
| 2,717,437 | 9/1955 | De Mestral | 24—201 X |
| 2,850,113 | 9/1958 | Turner | 55—290 X |
| 2,881,859 | 4/1959 | Nutting | 55—354 X |
| 2,966,960 | 1/1961 | Rochlin | 55—509 X |

FOREIGN PATENTS

| | | |
|---|---|---|
| 5,086 | 1894 | Great Britain. |
| 15,091 | 1906 | Great Britain. |

HARRY B. THORNTON, *Primary Examiner.*

HERBERT L. MARTIN, *Examiner.*

R. R. WEAVER, S. S. HUSTING, *Assistant Examiners.*